United States Patent
Bogatez

(10) Patent No.: US 6,599,015 B1
(45) Date of Patent: Jul. 29, 2003

(54) BAG AND METHOD OF PRODUCTION

(75) Inventor: Edwin Lorenzo Bogatez, Artarmon (AU)

(73) Assignee: Handletec Pty. Ltd. (AU)

( * ) Notice: Subject to any disclaimer, the term of this patent is extended or adjusted under 35 U.S.C. 154(b) by 0 days.

(21) Appl. No.: 09/214,014

(22) PCT Filed: Jun. 20, 1997

(86) PCT No.: PCT/AU97/00394
§ 371 (c)(1),
(2), (4) Date: Dec. 21, 1998

(87) PCT Pub. No.: WO97/48550
PCT Pub. Date: Dec. 24, 1997

(51) Int. Cl.[7] .............................................. B65D 33/06
(52) U.S. Cl. ............................ 383/6; 150/107; 24/265 A
(58) Field of Search .......................... 24/114.5, 129 B, 24/561, 715.4, 265 A, 115 A; 383/6, 14, 17, 20, 25, 26, 28; 150/107, 110; 229/125.22

(56) References Cited

U.S. PATENT DOCUMENTS

| | | | | | |
|---|---|---|---|---|---|
| 232,285 | A | * | 9/1880 | Manneck | 24/114.5 |
| 233,703 | A | * | 10/1880 | Scheuer | 150/110 |
| 1,153,291 | A | * | 9/1915 | Costello | 2/175.7 |
| 2,075,672 | A | | 3/1937 | Stark | |
| 2,234,577 | A | * | 3/1941 | Reiter | 24/265 A |
| 2,248,328 | A | * | 7/1941 | Bechik | 16/444 |
| 2,307,659 | A | * | 1/1943 | Avery | 383/6 X |
| 2,744,556 | A | * | 5/1956 | Reiter | 150/107 |
| 2,821,229 | A | * | 1/1958 | Reiter | 383/20 |
| 2,860,396 | A | * | 11/1958 | Reiter | 383/6 X |
| 2,862,269 | A | * | 12/1958 | Reiter | 383/6 X |
| 2,992,768 | A | * | 7/1961 | Gatward | 363/26 X |
| 3,279,512 | A | * | 10/1966 | Paynor | 24/114.5 |
| 3,323,184 | A | * | 6/1967 | Reiter | 383/6 X |

FOREIGN PATENT DOCUMENTS

| | | | | |
|---|---|---|---|---|
| CH | 307499 | * | 8/1955 | 383/20 |
| DE | 2132 574 | | 1/1973 | |
| DE | 41 35 962 A 1 | | 9/1992 | |
| DE | 44 25 754 A 1 | | 1/1996 | |
| FR | 2479148 | * | 10/1981 | 383/26 |
| SE | 86013 | * | 4/1936 | 383/20 |

OTHER PUBLICATIONS

Derwent Abstraction Accession No. 95–351508/46, AT 9401418, A (Input GmbH Innovative Prod & Technologie), Sep. 15, 1995.

* cited by examiner

Primary Examiner—Jes F. Pascua
(74) Attorney, Agent, or Firm—Knobbe Martens Olson & Bear LLP

(57) ABSTRACT

This invention relates to a method for attaching a flexible cord handle on a bag comprising the steps of: forming a pair of apertures through a bag wall, providing at least one substantially planar obstruction member with at least one cord receiving passageway therethrough, passing at least one free end of a flexible cord through one of said apertures and into a respective cord receiving passageway of the obstruction member, and fixing the free end of the cord to the obstruction member by deforming at least a portion of the obstruction member surrounding the cord, and further wherein the greatest dimension of the obstruction member is larger than the aperture in the bag wall.

8 Claims, 19 Drawing Sheets

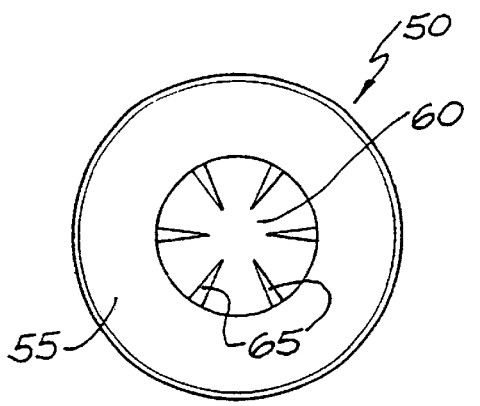
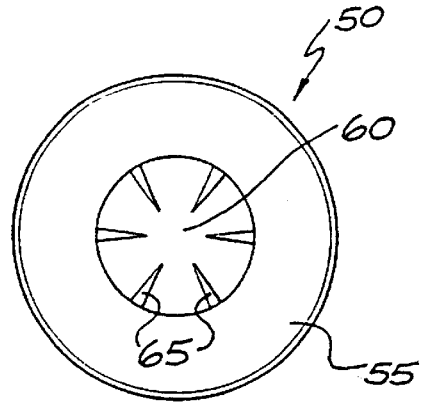
FIG. 3(a)   FIG. 3(b)
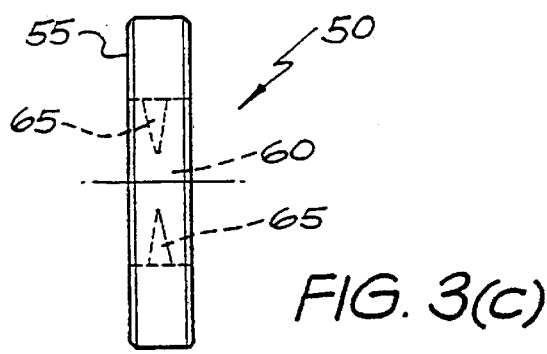
FIG. 3(c)
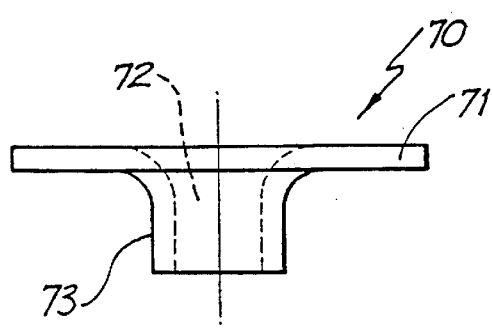
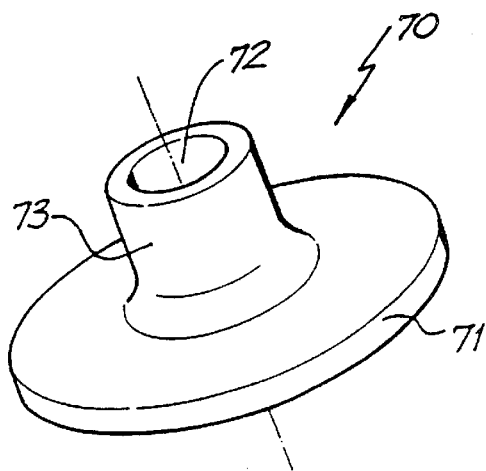
FIG. 4(a)   FIG. 4(b)

BAG AND METHOD OF PRODUCTION

BAG AND METHOD OF PRODUCTION

1. Field of the Invention

The present invention relates to bags, methods for providing a handle on a bag, and apparatus for attaching a handle to a bag, in particular, but not only, shopping bags with flexible cord handles.

2. Background of the Invention

In the fierce field of retail marketing and related services, the use and recognition of brand names is vital. Gone are the days when an assistant would place your purchased items in a plain plastic or brown paper bag. Now most individual boutiques, jewellery shops etc have their own customer bags of various sizes and shapes with the names and logos of the shop or its products printed thereon. Such bags are an effective advertisement for the product or outlet. One particularly popular type of bag has a pair of flexible cord handles which pass through apertures in the bag, the free ends of the handles being tied to prevent disengagement of the handle from the bag. The flexible cord handle is comfortable to use, provides an aesthetically pleasing, high quality product and is easier to pack than rigid handled bags since the flexible cord will drape downwardly on the outside faces of the bag.

Connecting such handles to the bag wall itself, however, creates certain difficulties. Normally the handle is manually passed through the apertures adjacent to the open upper end of the bag and the free ends tied in knots to prevent the handle from disengaging from the bag. This is slow, expensive and labour intensive process, particularly if the handle is produced from a woven cord which has very little rigidity in the axial direction. Further, the possibility of human error cannot be discounted and if the knots are improperly tied, the handle may disengage from the bag altogether leading to damage of the bag contents.

Handles are also known to be fitted to bags via adhesive strips which makes their security dependant on the adhesive and tearability of the strip and/or bag.

It is the intention of the applicant to provide a method and apparatus for attaching flexible cord handles to bags or other receptacles which offers a useful alternative to known arrangements.

DISCLOSURE OF THE INVENTION

In a first aspect, the present invention provides a method for attaching a flexible cord handle on a bag comprising the steps of;

forming a pair of apertures through a bag wall, providing at least one substantially planar obstruction member with at least one cord receiving passageway therethrough, passing at least one free end of a flexible cord through one of said apertures and into a respective cord receiving passageway of the obstruction member, and fixing the free end of the cord to the obstruction member by deforming at least a portion of the obstruction member surrounding the cord, and further wherein the greatest dimension of the obstruction member is larger than the aperture in the bag wall.

In a second aspect, the present invention provides a bag made according to the aforementioned method. Preferably the bag comprises a pair of flexible cord handles adjacent to an open mouth of the bag.

The bag may comprise any suitable flexible material such as paper, light cardboard, plastic film or fabric.

Preferably, the bag comprises a pair of obstruction members for each handle, one obstruction member being fixed to each respective free end of the cord. Alternatively, the bag may include a single obstruction member for each flexible cord handle, such an obstruction member having a pair of cord receiving passageways adapted to be fixed to both free ends of each flexible cord handle.

In a third aspect, the present invention provides a substantially planar obstruction member when used in the method of the first aspect of the invention, which member is suitable for attachment to a free end of a flexible cord handle, the obstruction member comprising a wall portion with a cord receiving passageway therethrough adapted to engage and hold the flexible cord wherein the greatest dimension of the wall portion is substantially larger than the diameter of the flexible cord.

The obstruction member may be produced from virtually any material such as metal, wood, rubber, plastic, compressed fibres etc. In one embodiment, the obstruction member is constructed from a resilient material with the undeformed diameter of the cord receiving passageway being smaller than the diameter of the flexible cord. This provides an obstruction member which may be deformed to allow insertion of a flexible cord after which the obstruction member may be relaxed to engage and hold the flexible cord.

In another embodiment, the obstruction member includes a plurality of inwardly directed prongs, ridges or the like adapted to grip and hold the flexible cord passing through the cord receiving passageway.

Alternatively, the obstruction member may be fixed to the cord by means of an adhesive or by directly moulding the obstruction member onto the cord.

The cord itself may be of any suitable flexible material however woven polyethylene strands are particularly preferred. Such a woven structure provides for better engagement of the prongs.

In a fourth aspect, the present invention provides an apparatus for attaching a flexible cord handle to a bag wall, said apparatus comprising a cord supply means for providing a length of flexible cord, a bag wall supply means for providing a bag wall with a pair of apertures therethrough, and an obstruction member supply means for providing at least one substantially planar obstruction member for each length of cord, each obstruction member having at least one cord receiving passageway therethrough adapted to receive and hold the cord, said apparatus further comprising a cord insertion means for passing each free end of the length of cord on a first side of said wall through a respective aperture into the cord receiving passageway of a respective obstruction member on an opposite side of the bag wall and fixing each free end to that respective obstruction member.

The obstruction member supply means preferably provides pairs of obstruction members for each flexible cord handle. Alternatively, a single obstruction member may be used for attachment to both free ends of the flexible cord handle. Preferably, in addition to holding the cord and inserting each free end into the cord receiving passageway of the obstruction member, the cord insertion means may include a spreader means adapted to temporarily deform the obstruction member to allow for easy insertion of the cord through the cord receiving passageway.

Preferably, the free end of the cord is doubled back on itself before being inserted into the cord receiving passageway of the obstruction member, so that the free end of the cord and the handle are on the opposite side of the bag wall to the obstruction member.

As a matter of choice the obstruction member can be positioned on the interior or exterior side of the bag wall. If the obstruction member is decorative or includes additional advertising material, it may be desirable to have it positioned on an exterior side of bag.

BRIEF DESCRIPTION OF THE DRAWINGS

So that the present invention may be more clearly understood it will now be described, by way of example only with reference to the accompanying drawings in which:

FIGS. 3(a), 3(b) and 3(c) are front and rear elevational views and a cross-sectional view respectively, of the obstruction member according to a first embodiment of the present invention;

FIGS. 4(a) and 4(b) are side elevational and perspective views respectively of the obstruction member according to another embodiment of the present invention;

BEST MODE FOR CARRYING OUT THE INVENTION

Figure 1:
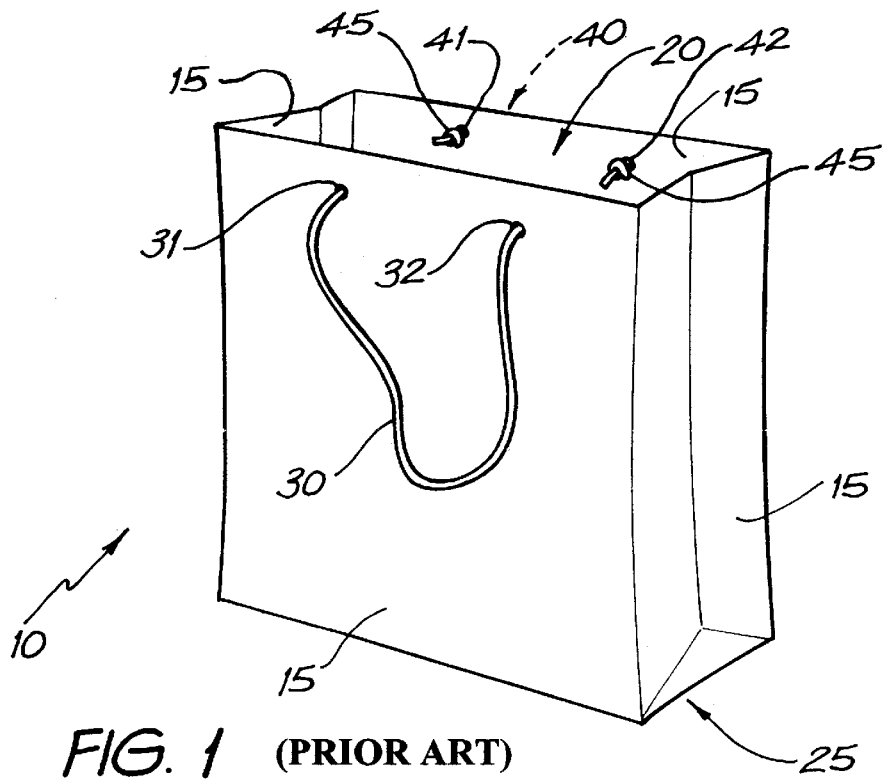
FIG. 1 is a perspective view of a conventional bag/receptacle.

As shown in FIG. 1, a conventional bag 10 is defined by a plurality of walls 15 with an open upper end 20 and a closed lower end 25.

Adjacent its upper end are a pair of flexible cord handles 30, 40 on approximately opposite sides of the bag. The flexible cord handles 30, 40 pass through respective pairs of apertures 31, 32 and 41, 42 in the bag walls.

As per conventional practice, the free ends of the handles are tied in knots 35 (not shown) and 45 on the interior side of the bag such that the ends of handles 30, 40 cannot slide through the apertures in the bag wall and the handle disengage from the bag.

As previously discussed, however, this conventional process is labour intensive, expensive and unreliable. The applicant proposes to replace the knots 35 and 45 with at least one substantially planar obstruction member adapted to be fixed to the free ends of the handles 30,40.

An example of such an obstruction member 50 is shown in FIGS. 3(a)–3(c). The obstruction member 50 comprises a wall portion 55 and a cord receiving passageway 60 passing through the obstruction member. The diameter of the cord receiving passageway 60 is sized to receive the flexible cord. The outer diameter of the wall portion is substantially larger than passageway 60 or the diameter of the flexible cord on which it will be placed.

When the free end of a flexible cord is received by and fixed to the obstruction member 50 on one side of a bag wall, the free end of the cord is prevented from passing through the aperture in the bag wall to the opposite side since the obstruction member 50 is too large to pass through the aperture in the bag wall.

The obstruction member 50 may be fixed to the free end of the cord by any appropriate means including adhesive or direct moulding of the obstruction member 50 on the cord. Preferably, however, the internal surface of the cord receiving passageway 60 is adapted to grip or hold the cord without the use of additional means such as adhesive. Most preferably, as shown in FIGS. 3(a)–3(c) the internal surface of the cord receiving passageway 60 may be provided with inwardly directed ridges, prongs 65 or the like to assist in reliable gripping of the flexible cord by the obstruction member 50.

Figure 2:
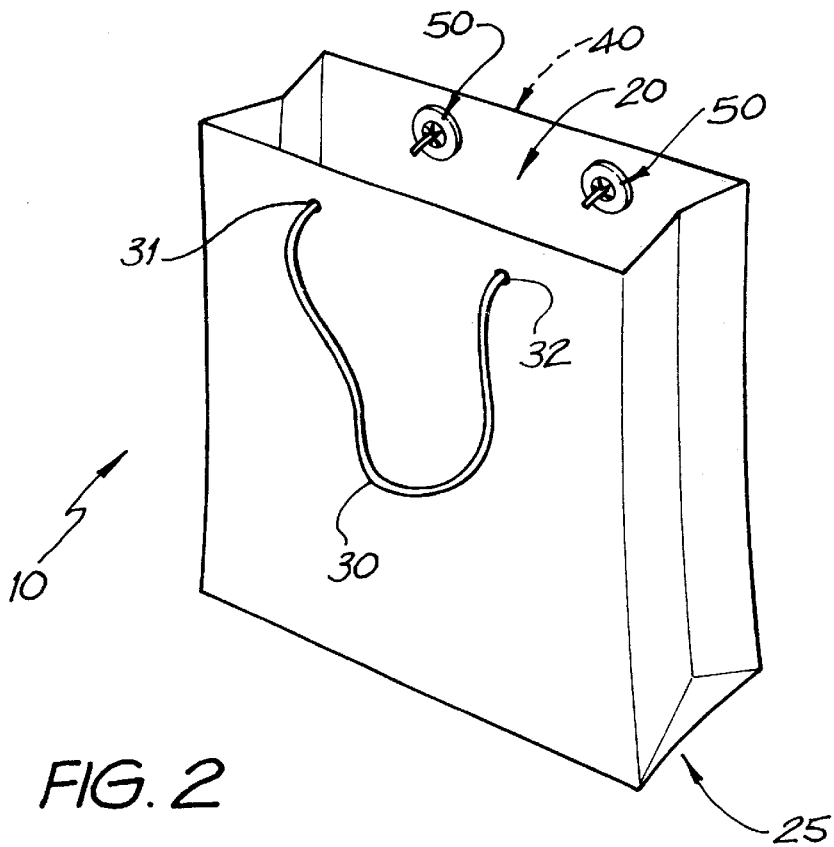
FIG. 2 is a perspective view of a bag according to the present invention.
Figure 2A:
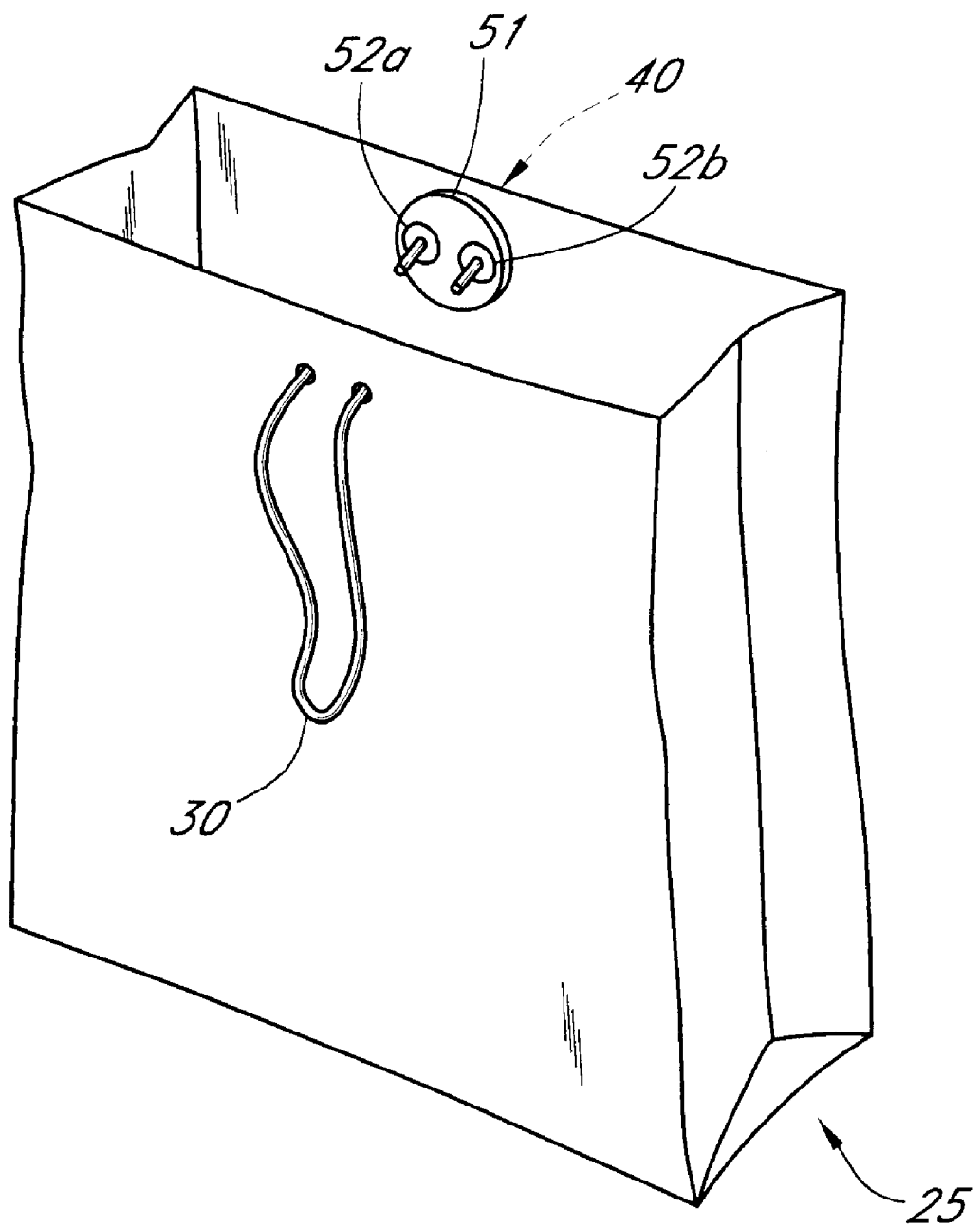
FIG. 2(a) is a perspective view of a bag according to another embodiment of the present invention.

The obstruction member 50 shown in FIGS. 3(a)–3(c) has a single cord receiving passageway 60 and is adapted to be fixed to a single free end of the flexible cord handle 30, 40. Two such obstruction members 50 can be used for each flexible cord handle on a bag as shown in FIG. 2. In another embodiment as illustrated in FIG. 2A, the bag 25 may include a single obstruction member 51 for each flexible cord handle 30, 40. As FIG. 2A illustrates, the obstruction member 51 has a pair of cord receiving passageways 52a, 52b adapted to be fixed respectively to each free end of the flexible cord handle 40. In another embodiment as shown in FIGS. 4(a) and 4(b), the obstruction member may be provided by a plate or elongated member with a pair of cord receiving passageways therethrough to be fixed to both free ends of the flexible cord handles.

Figure 7:
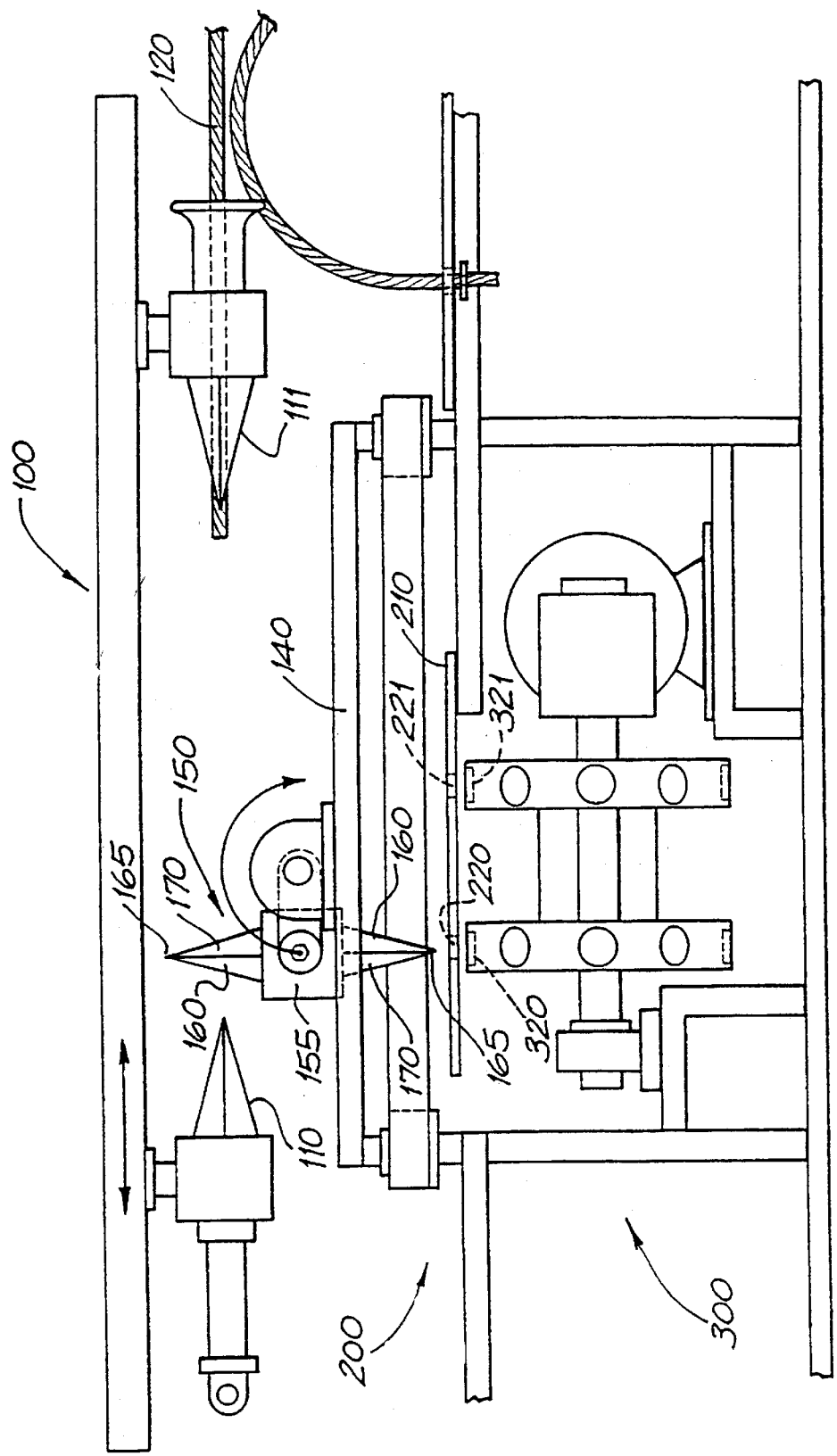
FIGS. 7 and 8 are side elevational and plan views respectively of an apparatus for providing a flexible cord handle on a bag/receptacle according to another embodiment of the present invention.
Figure 8:
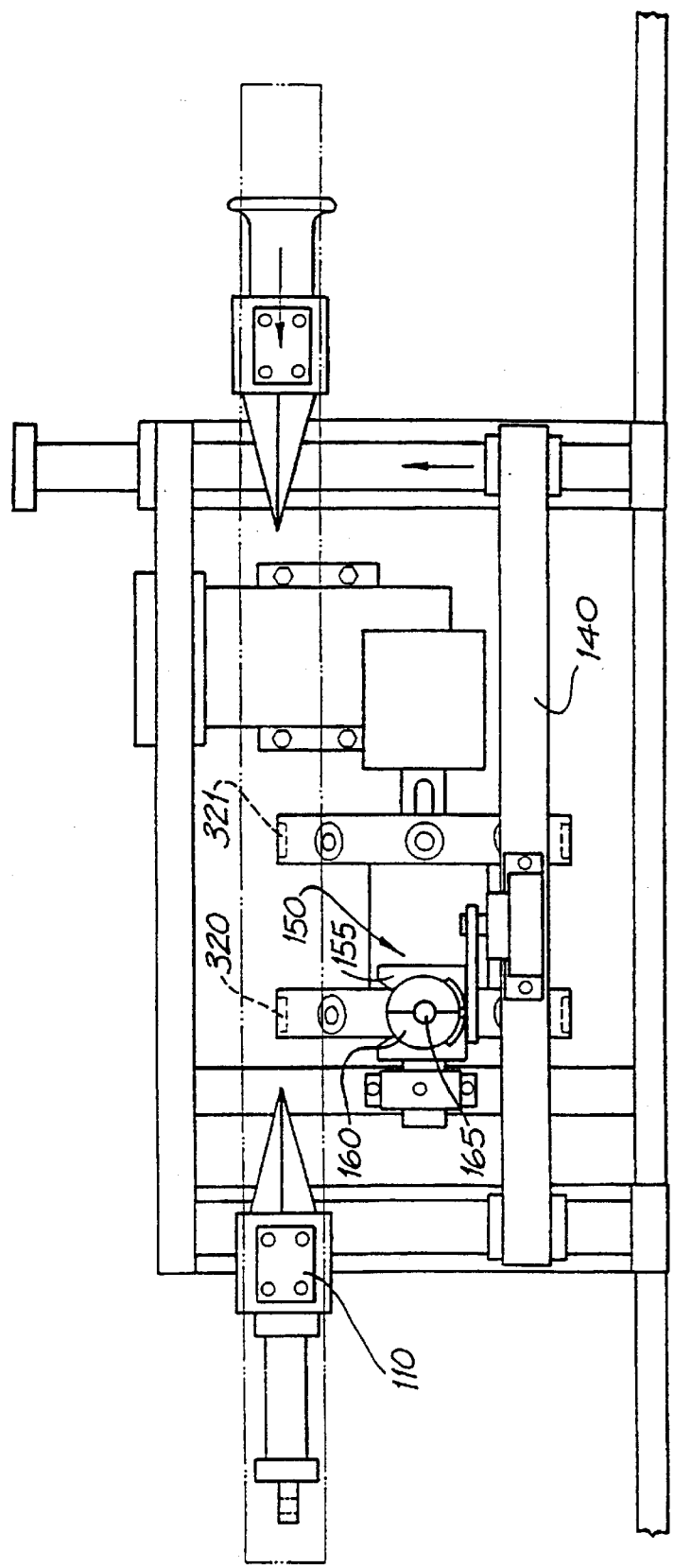

FIGS. 7 and 8 show an inventive apparatus for providing a flexible cord handle on a bag according to another embodiment of the present invention which is particularly suitable for use with the obstruction member 50 shown in FIGS. 3(a)–3(c). A device comprises a flexible cord supply section 100, a bag supply section 200 and obstruction member supply section 300.

The cord supply section 100 comprises a pair of mutually opposed claws or clamps 110, 111 which are movable relative to each other. A continuous flexible cord 120 is fed to claw 111 with a small portion of the cord 120 projecting from the end of claw 111 toward claw 110. To provide a length of cord for the bag handle, claw 110 is moved towards claw 111 to grab the exposed end of the cord 120. Claw 111 then releases its grip on the cord 120 and claw 110 moves away from claw 111 back to a predetermined position to thereby measure out the desired length of cord which is intended to form the bag handle. As discussed above, cord 120 may be made from virtually any flexible material however woven polyethylene strands are particularly suitable.

With the desired length of the cord 120 suspended between claws 111 and 110, a cord insertion means 150 mounted on slidable frame 140 is moved to a position directly below cord 120 suspended between claws 110 and 111. This cord insertion means 150 is substantially U-shaped in cross-section such that it may receive and hold the cord extending between claws 110 and 111. After the cord is received by a insertion means 150, an appropriate cutting means eg hot melt cutter, slicer, guillotine, cuts the desired length of cord between claws 110 and 111 to provide the conveyance means with a discreet length of flexible cord 120, the free ends of which are exposed on either side thereof.

Preferably, as shown in FIG. 7, the cord insertion means 150 is substantially "T"-shaped with a main body 155 and a pair of mutually opposed, outwardly directed gripper/spreader arms 160. Each gripper/spreader arm 160 comprises a thin tip portion 165 connected to the main body 155 by diverging walls 170. The tip 165 is sized to allow easy passage through the apertures in the bag wall into the cord receiving passageway of a respective obstruction members. The diverging walls 170 are adapted to deform the obstruction members or spread apart any prongs, ridges etc in the cord receiving passageway of the obstruction members while the cord is forced through by the gripper/spreader arm 160. Retraction of the gripper/spreader arm 160 then allows these prongs, ridges etc to return to their original inwardly directed configuration to engage the flexible cord.

In the embodiment shown, the bag supply section 200 is directly adjacent the cord supply section 100. This bag supply section 200 provides a bag wall 210 with a pair of apertures 220, 221 therethrough. The apertures are sized to slidably receive the flexible cord 120.

The obstruction member supply section 300 is preferably directly below the bag wall 210. In this embodiment, the obstruction member supply section comprises a pair of rotatable carousels which position substantially planar obstruction members 320, 321 directly below the apertures 220, 221 respectively ready to receive the free ends of the flexible cord.

The "T"-shaped cord insertion means 150, with its pair of mutually opposed arms 160, is adapted to pass the free ends of the flexible cord through the respective apertures 220 and 221 in the bag wall to engage obstruction members 320, 321 by rotating or toggling back and forth through approximately 180° ie the main body 155 moves 90° either side of its vertical position where the insertion means 150 initially grips the length of flexible cord 120.

Attachment of the obstruction members 320, 321 to the flexible cord occurs as follows;

Firstly, the relative position of the cord insertion means 150 to bag wall 210 is adjusted such that the main body 155 of the cord insertion means 150 is positioned symmetrically above and equidistant from both apertures 220, 221. The main body 155 of the cord insertion means, initially in its vertical (12 o'clock) position is then rotated in an anti-clockwise direction through 90° (to the 9 o'clock position) such that the free end of the flexible cord handle 120 held by the tip 165 on the left hand side of the cord insertion means 150, is forced through aperture 220 to engage the obstruction member 320 directly below. Once engaged, the left hand arm 160 of the cord insertion means 150 releases its grip on the flexible cord and the main body 155 rotates through 180° in a clockwise direction (to the 3 o'clock position) until the other free end of the flexible cord held by tip 165 on the right hand side of the insertion means 150 passes through aperture 221 to engage its respective obstruction member 321.

The right hand side of the cord insertion means 150 then releases its hold on the cord and the main body 155 of the insertion means rotates through 90° in an anti-clockwise direction to thereby return to its vertical (12 o'clock) cord receiving position. The bag wall with its newly attached flexible cord handle then passes out the apparatus, a new bag wall is supplied and claw 110 moves towards claw 111 to once again measure out the desired length of flexible cord.

In the embodiment shown, the obstruction member supply section 300 comprises a pair of rotating carousels to provide a pair of obstruction members for each handle. In another embodiment, a single obstruction member may be provided in the form of a plate or elongated web with a pair of cord receiving passageways therethrough adapted to be fixed to both free ends of the flexible cord.

FIGS. 4(*a*) and 4(*b*) show an alternative embodiment of the obstruction member 70. In this embodiment, the obstruction members comprises wall portion 71 and a cord receiving passageway 72 passing therethrough. In this embodiment the cord receiving passageway 72 is provided by a deformable sleeve or collar 73 extending outwardly from one side of the wall portion 71. To attach the obstruction member 70, the cord handle is fed through passageway 72 and the collar/sleeve 73 is permanently deformed or crimped over the cord to thereby grip the cord.

Figure 5:
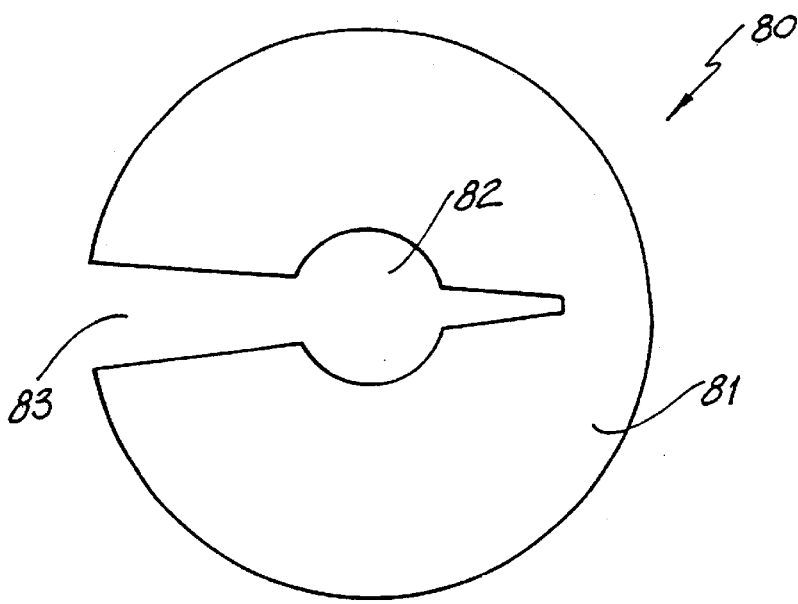
FIG. 5 is a front elevational view of the obstruction member according to yet another embodiment of the present invention.

Still a further embodiment shown in FIG. 5 in which the obstruction member 80 comprises a wall portion 81 and cord receiving passageway 82 therethrough. In this instance, the wall portion 80 has a sector 83 missing such that the obstruction member 80 may be crimped or swaged around the cord received in passageway 82.

Figure 6A:
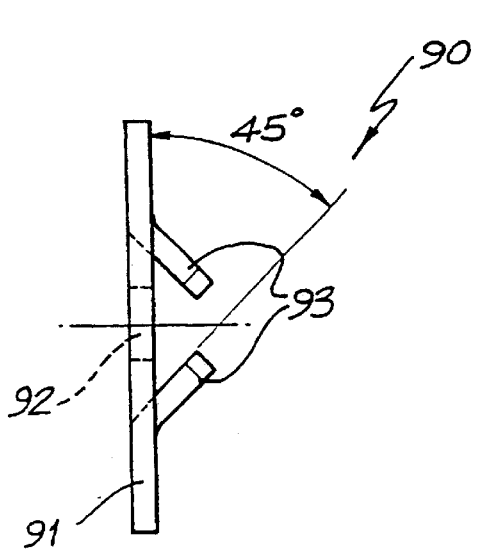
FIGS. 6(a) and 6(b) are side and front elevational views respectively of the obstruction member according to still another embodiment of the present invention.
Figure 6B:
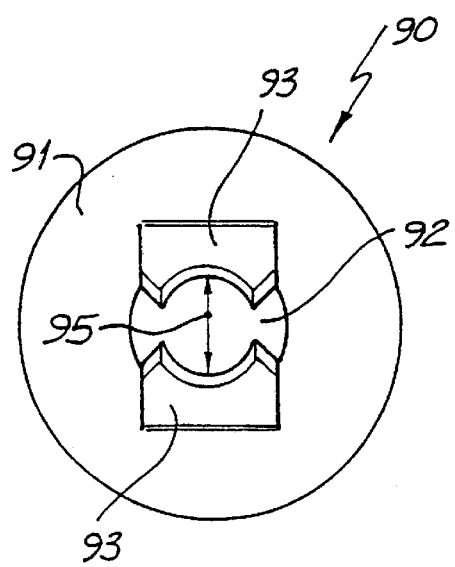

FIGS. 6(*a*) and 6(*b*) show yet a further embodiment of the inventive obstruction member 90. In this embodiment, the obstruction member 90 comprises wall portion 91, cord receiving passageway 92 and locking prongs or tangs 93 extending from one side of the wall portion 91. The locking prongs or tangs 93 are arranged to project radially inward to thereby engage and grip the cord passing through passageway 92. Preferably, the obstruction member 90 is constructed from metal or plastic. The locking prongs 93 are angled relative to one side of the wall portion 91. In this instance, the locking prongs 93 form an angle of approximately 45° with wall portion 91. To attach the obstruction member, the cord is fed from the opposite side of the obstruction member 90 through cord receiving passageway 92 and past the locking prongs 93. The diameter of clearance portion 95 between the locking prongs 93 is smaller than the cord receiving passageway 92 formed in the obstruction member 90. In this way, the locking prongs engage and grip the cord to prevent disengagement of the obstruction member from the free end of the cord. Due to the angle of the locking prongs/tangs 93 to the wall portion 91, any attempt to pull the cord back through cord receiving passageway 92 results in the locking prongs 93 being pulled towards each other thereby increasing the grip on the cord therebetween. If, as is usual, the cord is made from a woven material, the serrated or sharp edges of the locking prongs may embed in the cord. To avoid damage to the cord itself, the angle of the locking prongs 93 relative to the wall portion 91 may be altered.

Figure 9:
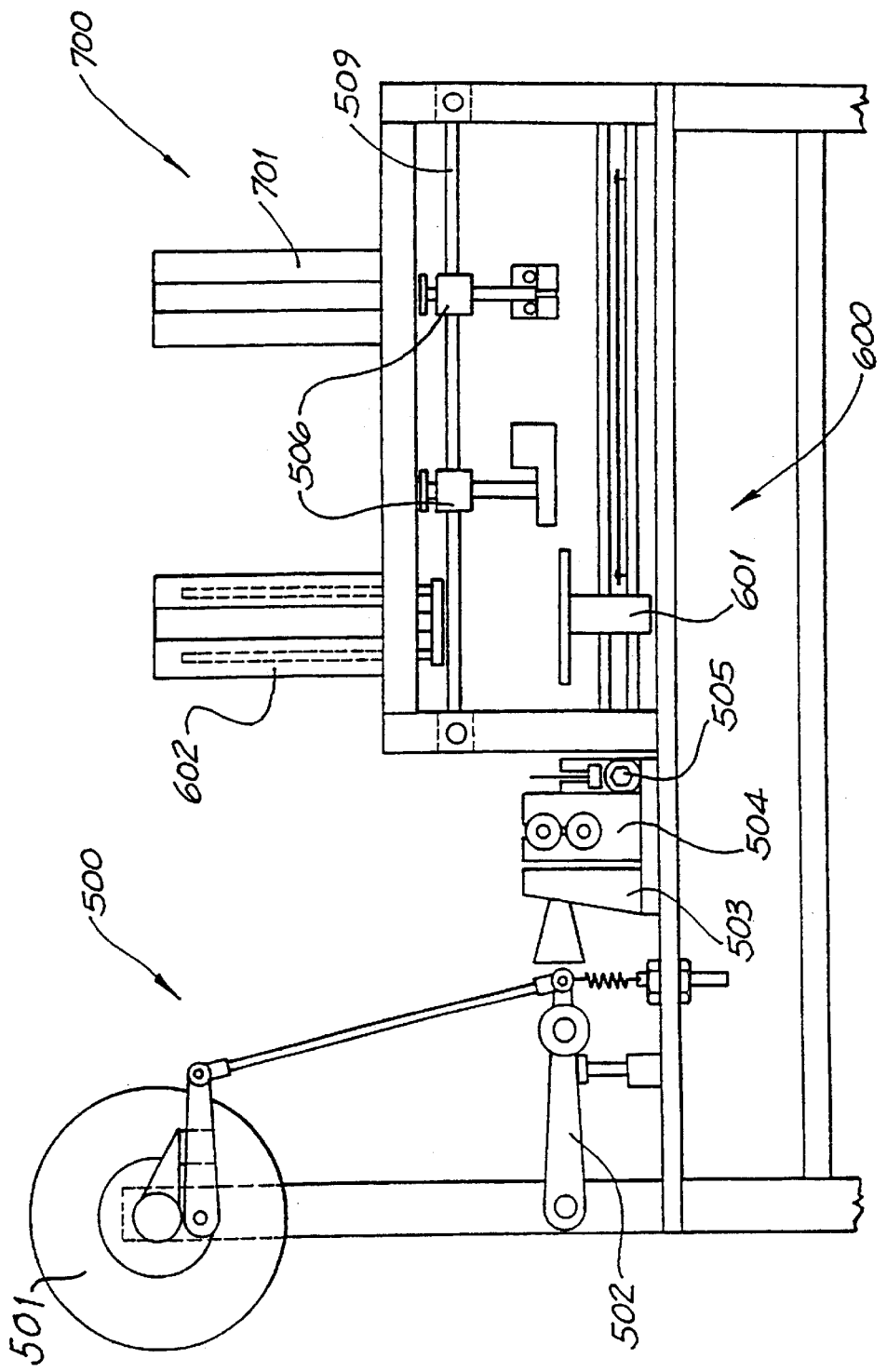
FIGS. 9, 10 and 11 are front, top and side elevational views respectively of an apparatus for providing a flexible cord handle on a bag/receptacle according to yet another embodiment of the present invention.
Figure 10:
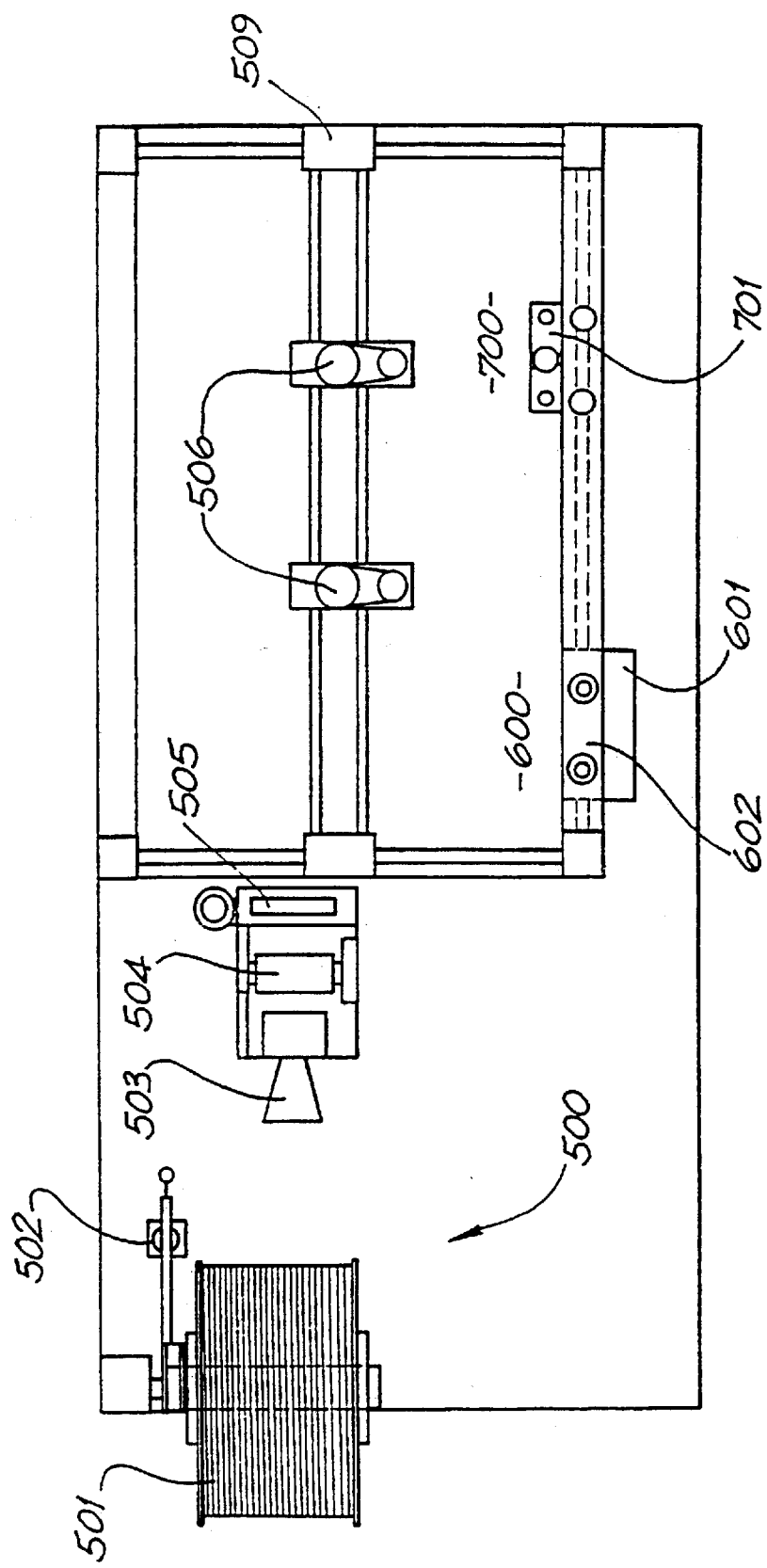
Figure 11:
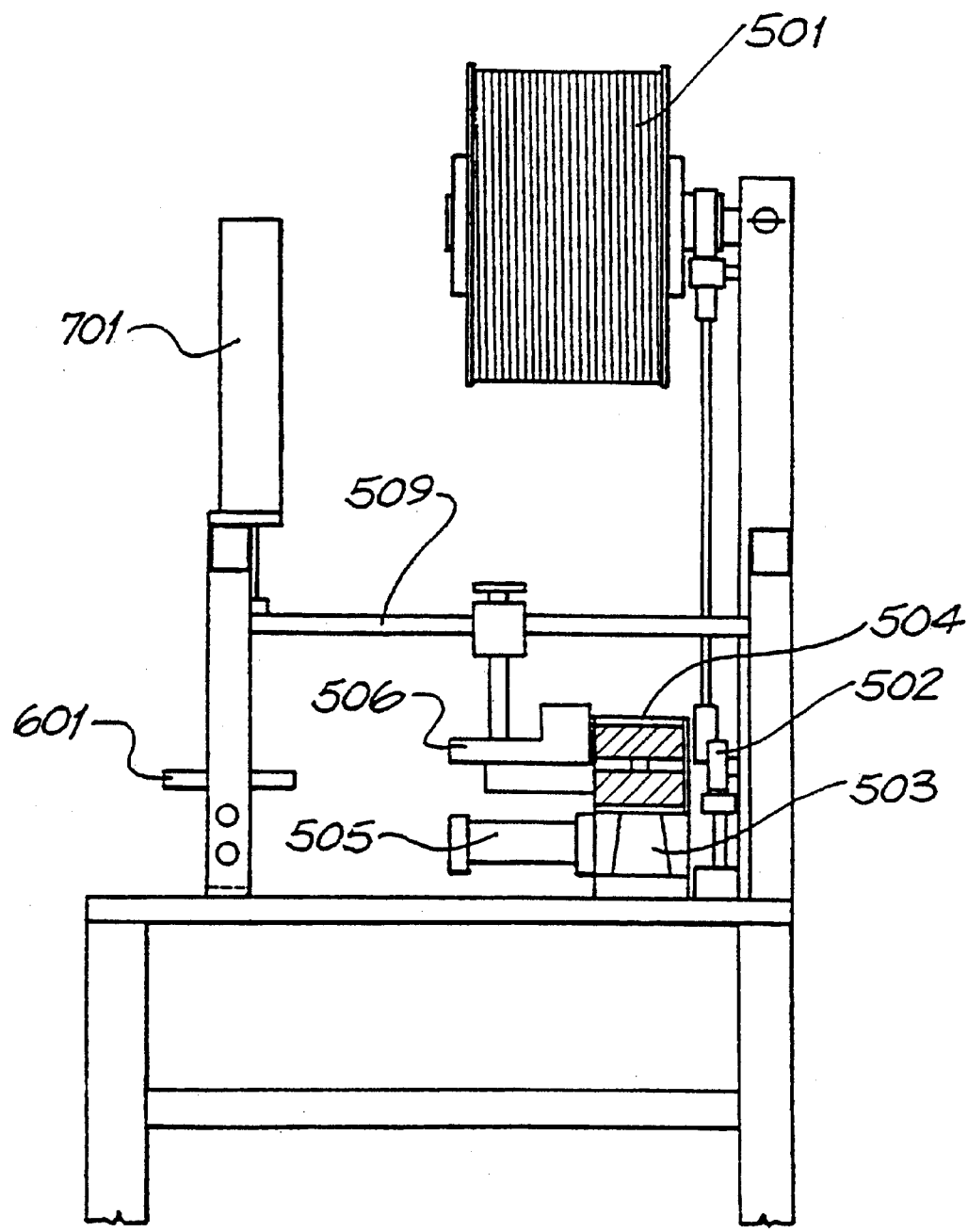
Figure 12:
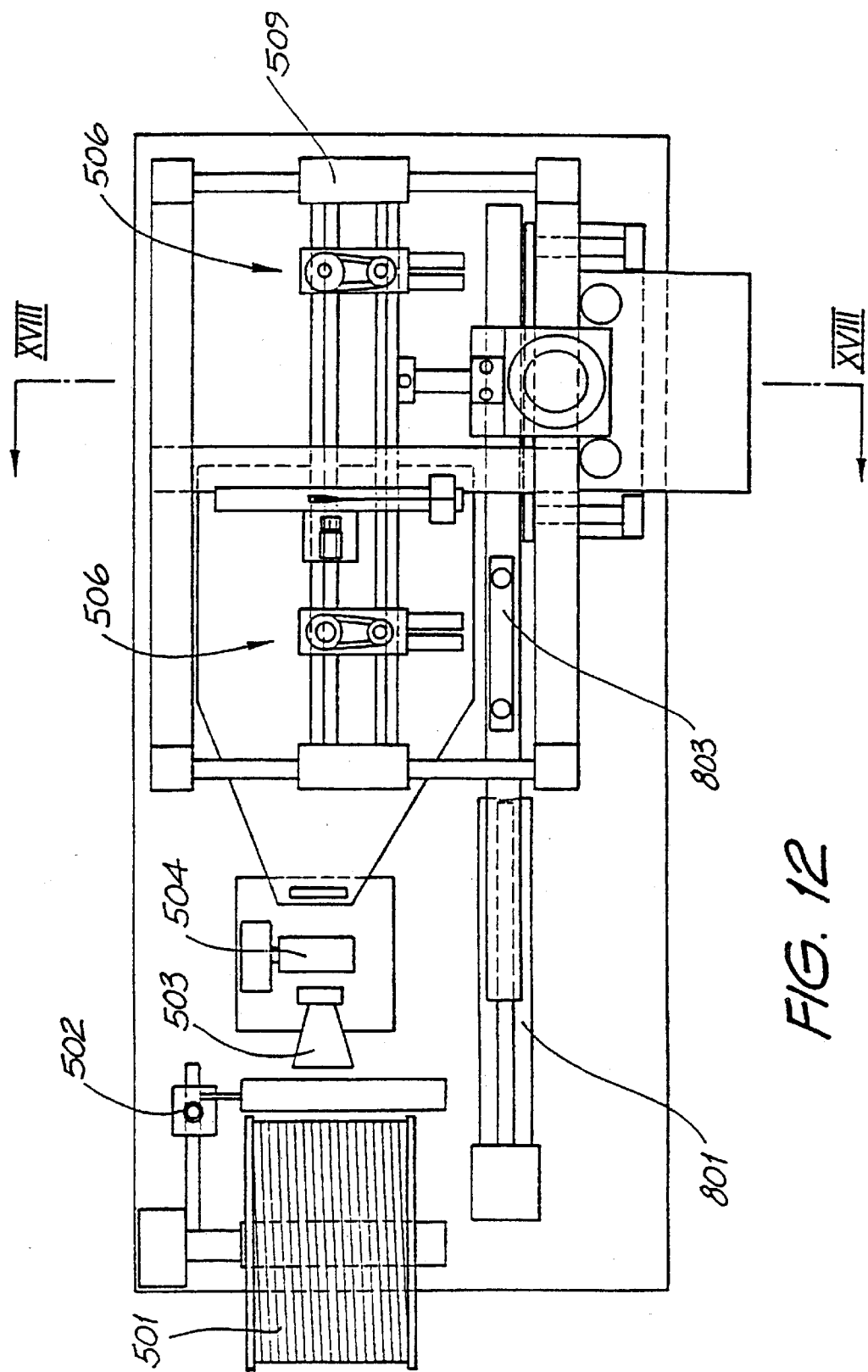
FIG. 12 is a schematic plan view of an embodiment of apparatus in accord with the present invention.
Figure 13:
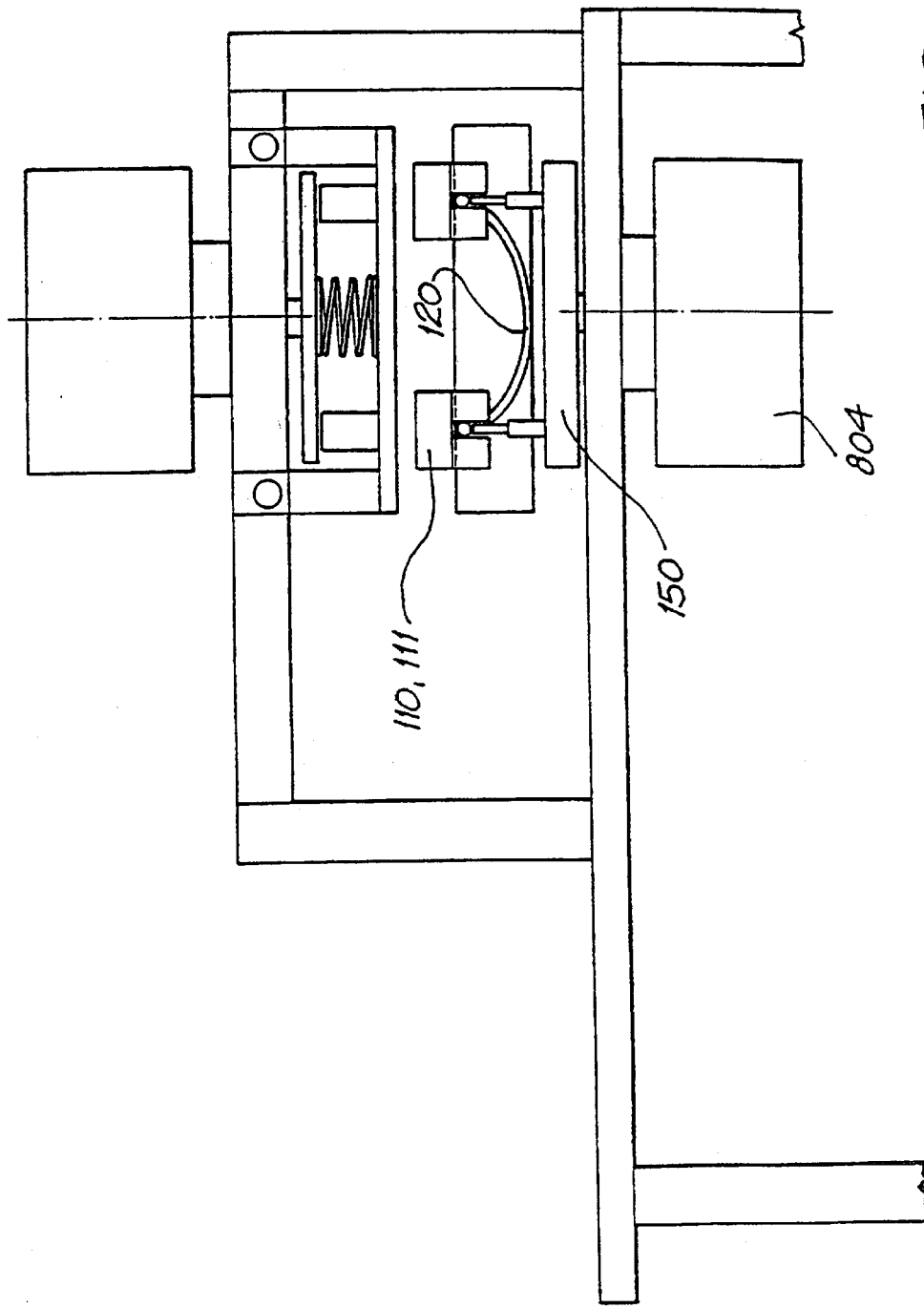
FIG. 13 is a front elevation view of a part of the apparatus of FIG. 12.
Figure 14:
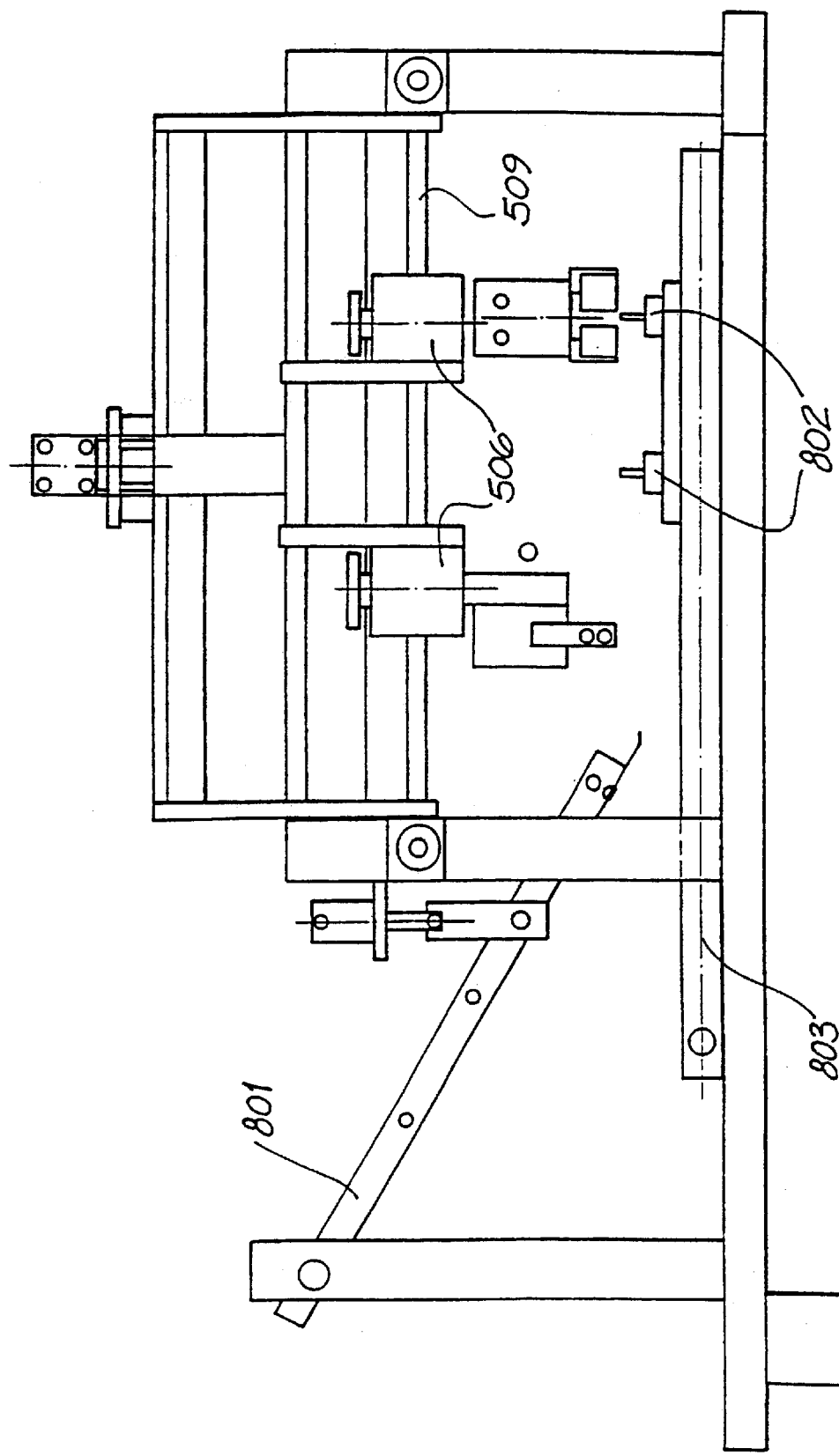
FIG. 14 is a front elevation view of the apparatus of FIG. 12 showing parts of the apparatus different from those shown in FIG. 13.
Figure 15:
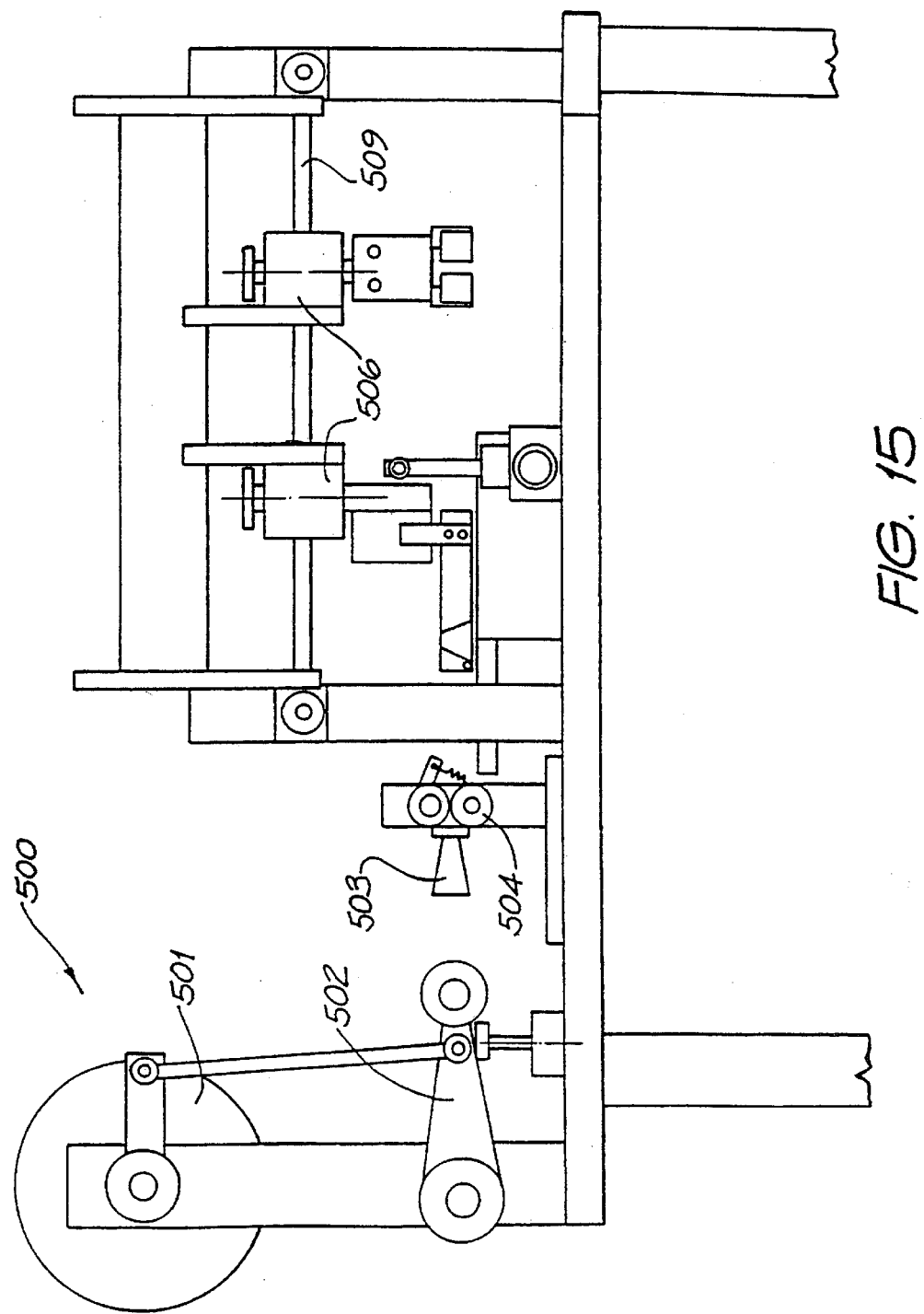
FIG. 15 is a further front elevation view of the apparatus of FIG. 12 with various of the components deleted for clarity.
Figure 16:
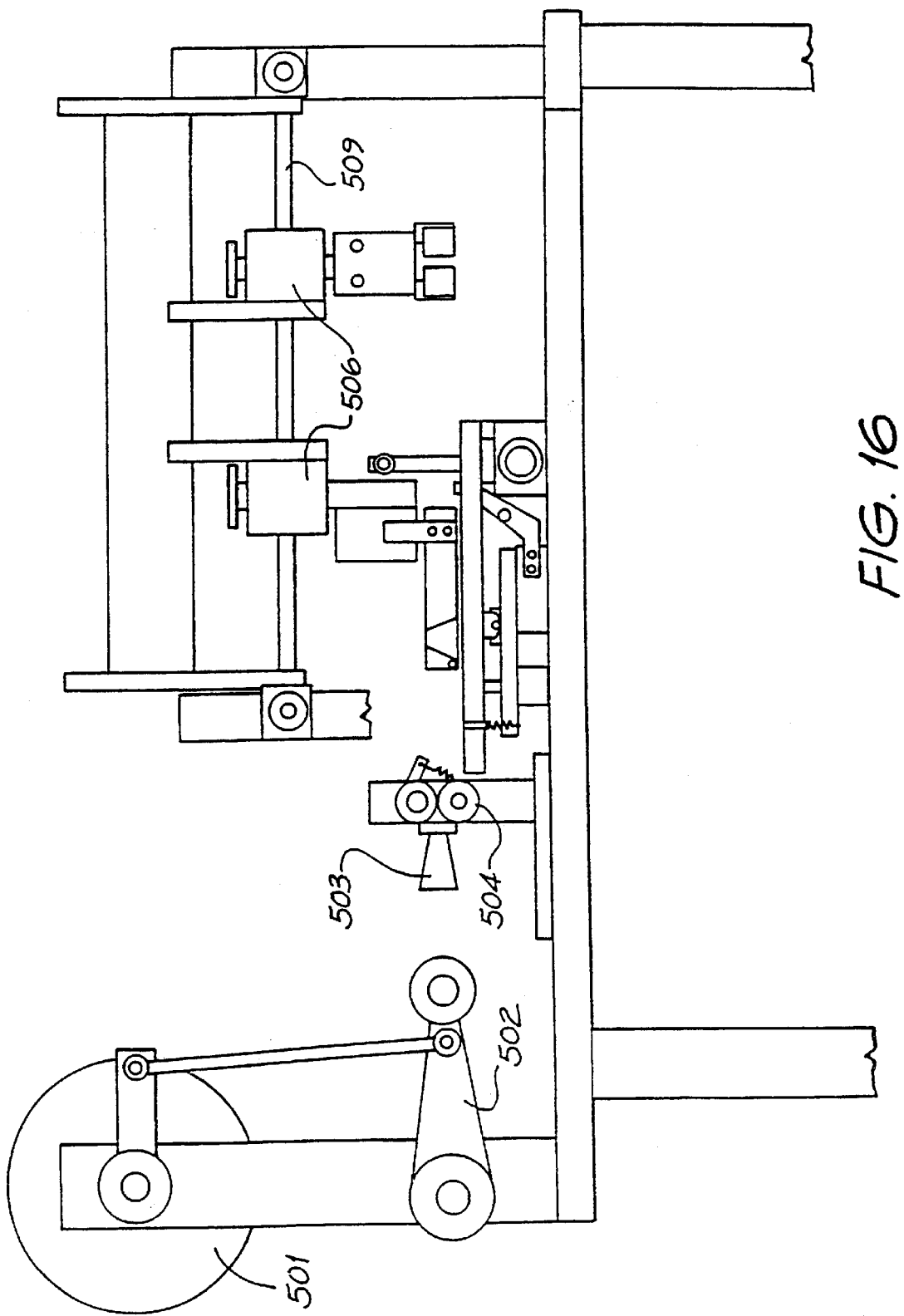
FIG. 16 is a similar view to FIG. 15 but with some of the components added that are omitted from FIG. 15.
Figure 17:
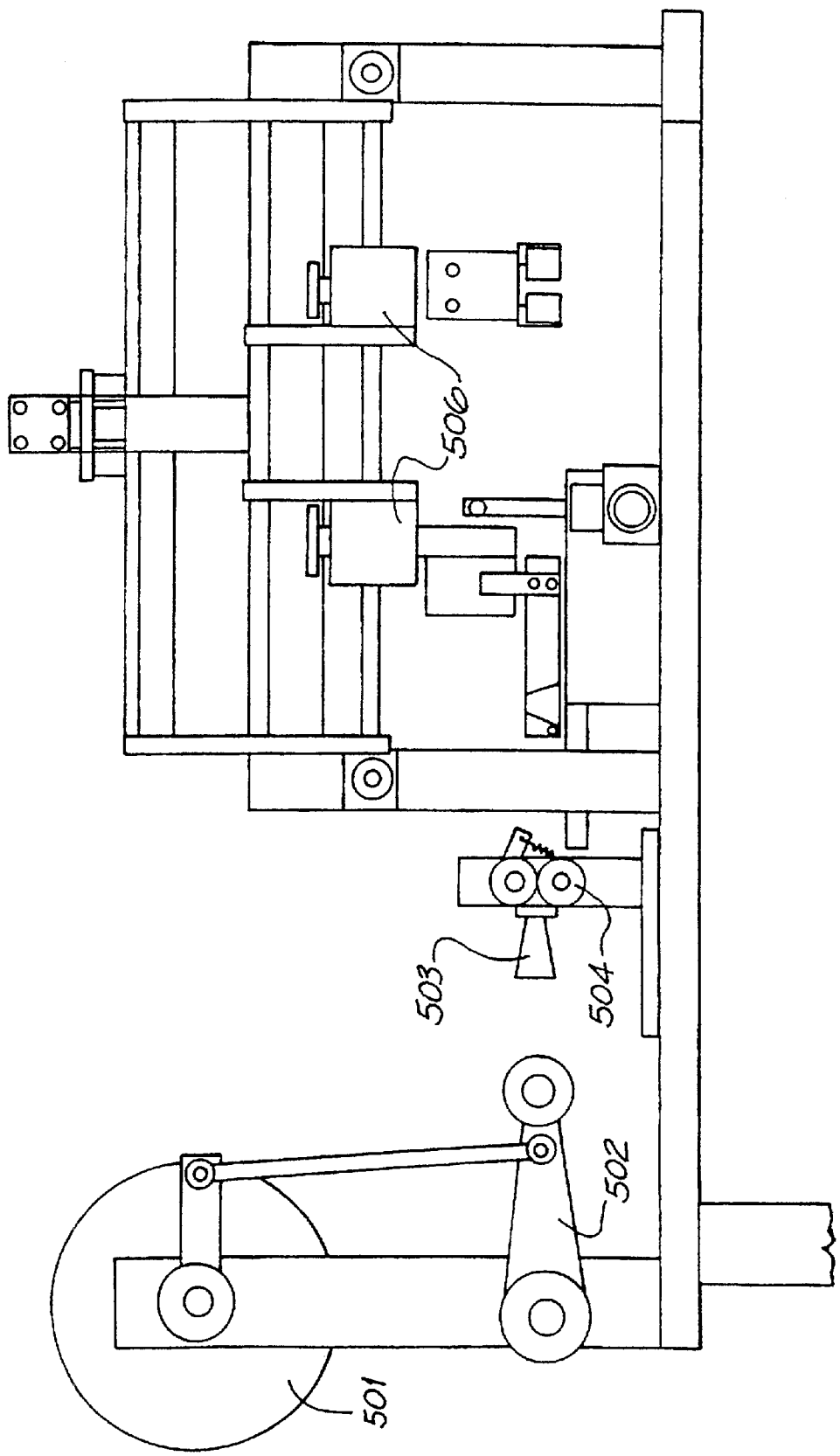
FIG. 17 is a similar view to FIG. 15 but with additional components depicted.
Figure 18:
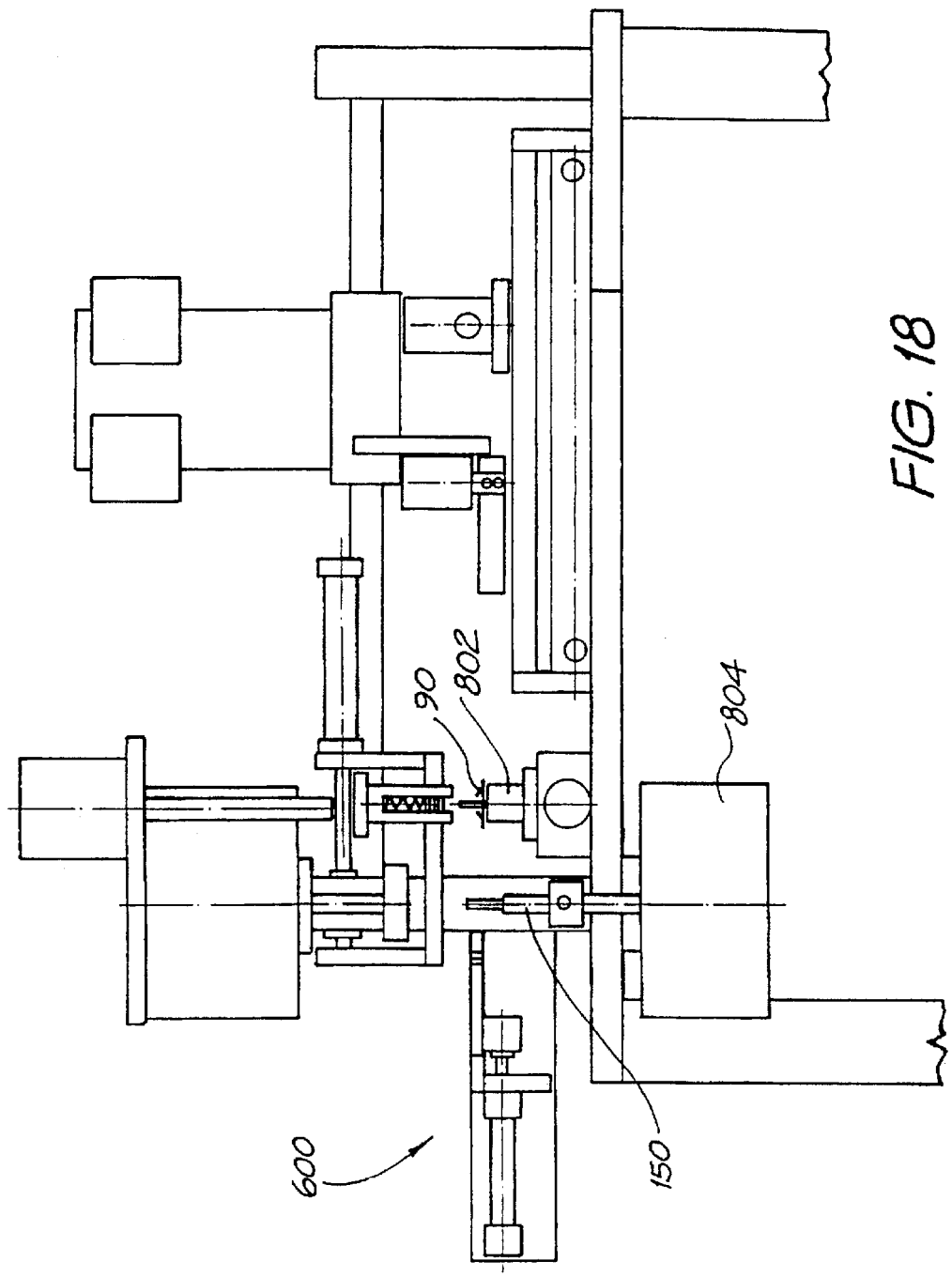
FIG. 18 is a side elevation view XVIII—XVIII of FIG. 12.
Figure 19:
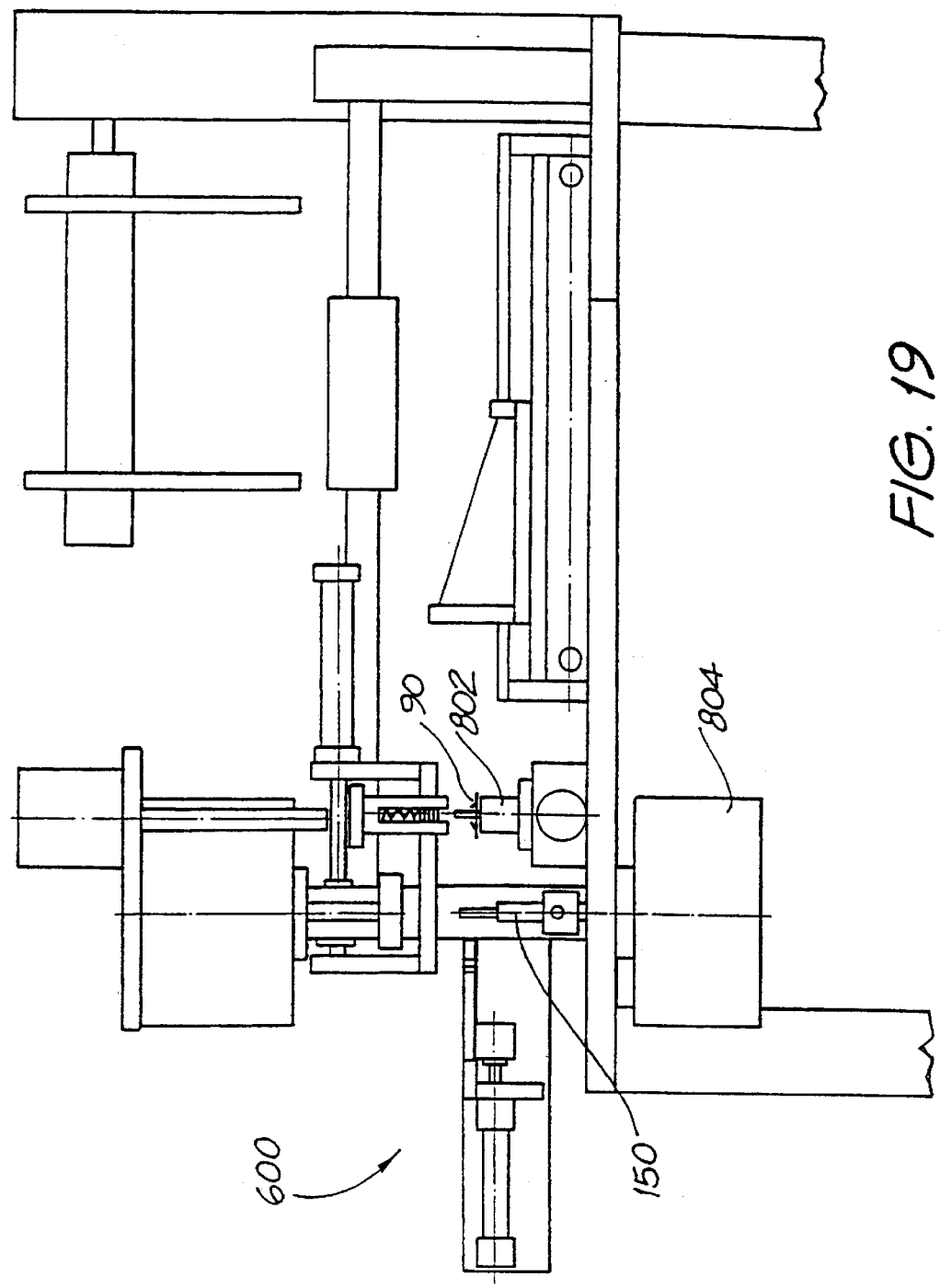
FIG. 19 is a similar view to FIG. 18 but showing different components which were omitted from FIG. 18 for clarity.
Figure 20:
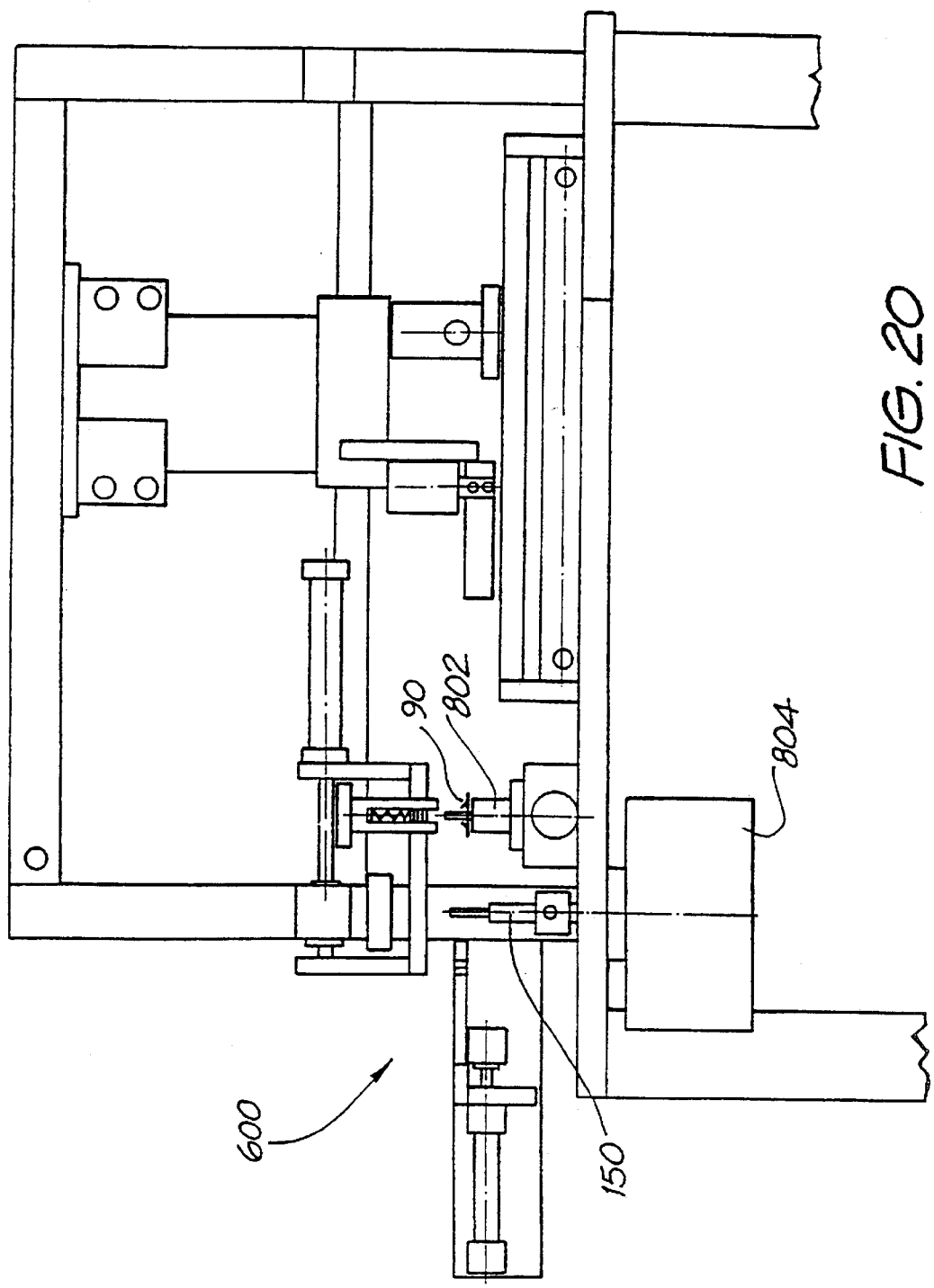
FIG. 20 is a similar view to FIG. 18 but showing additional components that have been omitted from FIG. 18 for reasons of clarity.
Figure 21:
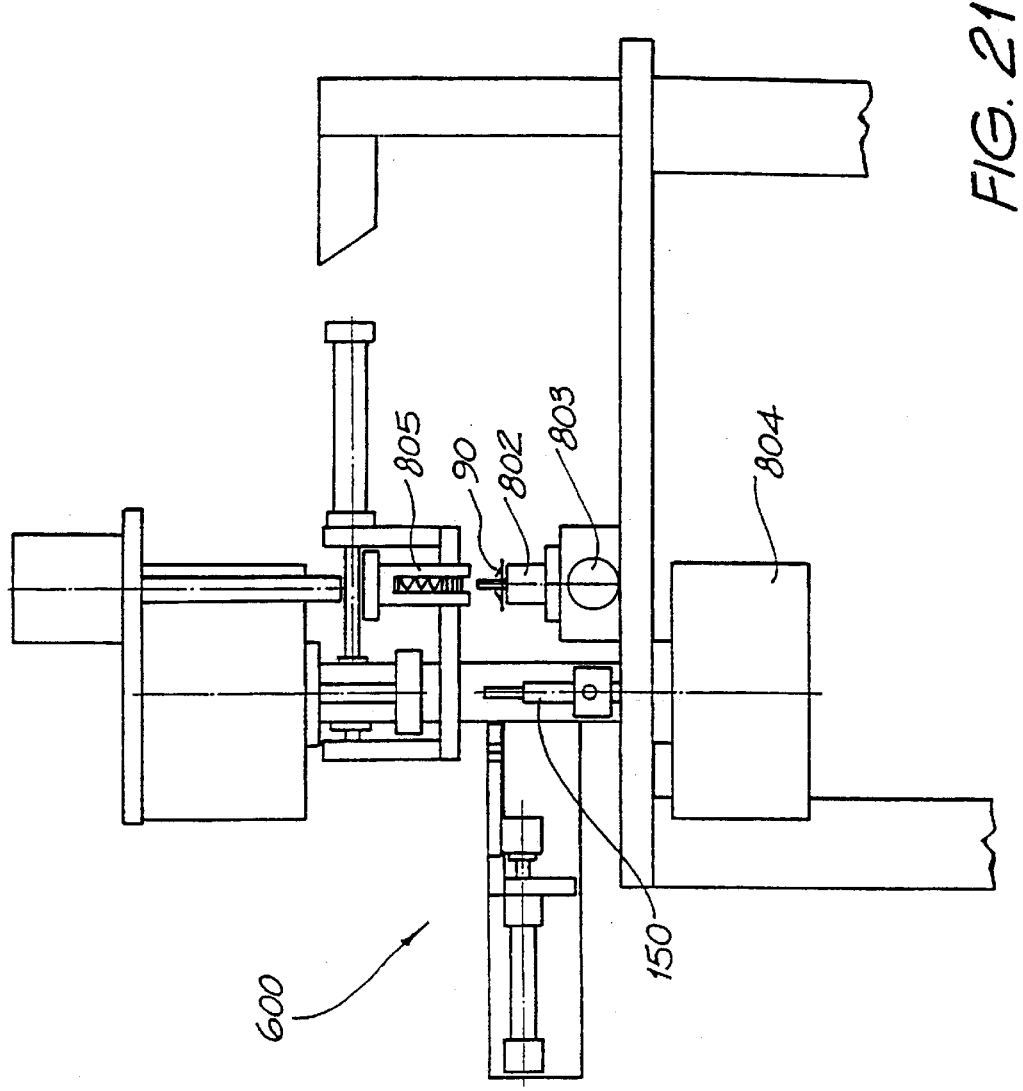
FIG. 21 is another side elevation view similar to FIG. 18 but with some components omitted for clarity.

FIGS. 9, 10 and 11 show a further embodiment of an inventive apparatus for providing a flexible cord handle on a bag. The device comprises a flexible cord supply section 500, a bag supply section 600 and an obstruction member supply section 700.

The cord supply section 500 comprises a roller 501 having a bulk supply of cord wound thereon, roller brake mechanism 502, cord centering bell 503, cord feed rollers 504 and mechanical cutting assembly 505. A pair of cord grippers 506 are slidably mounted on rod 509 which in turn can move laterally relative to the machine. These grippers 506 hold the desired length of cord therebetween.

Via the bag supply section 600, a bag is supplied to bag carrier 601. A punching assembly 602 provides apertures through the wall of the bag held by carrier assembly 600.

The bag and cord are then moved longitudinally toward the obstruction member supply section 700 at the far end of the machine. This section includes an obstruction member supply stack 701 which provides one or more obstruction members for attachment to the free ends of the cord.

Gripping members 506 are manipulated so that the cord is passed through the apertures in the bag wall and engaged by obstruction members supplied from obstruction member supply means 701. Once the obstruction members are attached to the free ends of the flexible cord, the completed bag is removed and the process repeated.

The apparatus embodiment schematically depicted in FIGS. 12–20 is marked with reference numerals corresponding to like components as shown in the apparatus embodiments of FIGS. 7 and 8 and 9–11.

In this embodiment the apparatus is shown as including a washer dispensing chute assembly 801 which holds a succession of discrete washers or obstruction members 90 of the embodiment of FIG. 6. Successive discrete washers 90 are picked up by each of washer pickup and transfer tools 802 mounted on washer pickup and transfer cylinder 803 which functions as a carriage to move pickup and transfer tools 802 beneath washer dispensing chute 801 so that each transfer tool 802 picks up one washer before returning to the position as shown in FIG. 14 or 18–20 to be ready to transfer washers 90 to the ends of cord section 120.

Cord insertion tool 150 comprises a pair of pins spaced apart and driven by pneumatic cylinder 804 to pass through the side wall of a bag placed on tray 600. Cord inserting tool 150 functions to also punch holes in the side wall of the bag with washer 90 on the opposite side to receive a doubled over end of the cord 120. Washer 90 is retained in magnetic washer locating tool 805 which drives washer 90 down onto the outer surface of the bag held against tray 600 to force locking prongs 93 to crimp on opposite sides of the doubled over end of cord 120.

While the present inventive method and apparatus has been described in relation to attaching flexible handles to bags, it will be understood by persons skilled in the art that the inventive obstruction member, method and apparatus are equally suitable for other types of receptacles for example buckets, boxes, baskets etc with flexible cord handles.

The obstruction member may include advertising material for example the name of the retail outlet providing the bags to its shoppers or may be shaped in the form of a company logo or symbol. Of course, in such a case it may be beneficial to position the obstruction member on the exterior side of the bag.

What is claimed is:

1. A bag having a bag wall defining an aperture, said bag comprising:

an obstruction member unconnected to the bag, said obstruction member having a cord receiving passageway therethrough wherein the obstruction member is positioned adjacent the aperture in the bag wall;

a length of cord wherein a free end of the cord is passed through the aperture and axially of the aperture through the cord receiving passageway of the obstruction member such that the cord passes directly from the aperture to the cord receiving passageway and completely through the obstruction member, the free end of the cord is fixed to the obstruction member by deforming at least a portion of the cord receiving passageway surrounding the cord such that the deformed cord receiving passageway alone fixedly retains the cord to the obstruction member, and wherein, when the obstruction member is fixed to the cord, the greatest dimension of the obstruction member is larger than the aperture in the bag wall.

2. The bag according to claim 1 wherein the cord comprises a flexible cord handle positioned adjacent to an open mouth of the bag.

3. The bag according to claim 1 wherein the cord has two free ends and is engaged by a pair of obstruction members in a manner such that each free end of the cord is fixed to each respective obstruction member, wherein each respective free end of the cord is fixed to a respective obstruction member.

4. The bag according to claim 1 wherein the cord has two free ends and is engaged by a single obstruction member fixed to both free ends of the cord.

5. The bag according to claim 1 wherein the obstruction member is positioned on the inside of the bag wall.

6. The bag according to claim 1 wherein the cord is made of woven polyethylene strands.

7. The bag according to claim 1 wherein the bag is constructed from a flexible material.

8. The bag of claim 1 wherein the obstruction member is substantially planar.

* * * * *